(12) United States Patent
Fienblit et al.

(10) Patent No.: US 7,979,238 B2
(45) Date of Patent: Jul. 12, 2011

(54) SYSTEM, METHOD AND COMPUTER PROGRAM PRODUCT FOR EVALUATING A TEST OF AN ALTERNATIVE SYSTEM

(75) Inventors: Shachar Fienblit, Ein Ayala (IL); Aviad Zlotnick, D.N.G.T. (IL)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 11/844,931

(22) Filed: Aug. 24, 2007

(65) Prior Publication Data

US 2009/0055832 A1      Feb. 26, 2009

(51) Int. Cl.
*G06F 13/38* (2006.01)

(52) U.S. Cl. ......... 702/182; 702/179; 702/183; 702/188

(58) Field of Classification Search ............ 702/57, 702/58, 66, 77, 79, 108, 121, 179, 182, 183, 702/187, 188; 707/8; 714/32, 38; 717/124, 717/130

See application file for complete search history.

(56) References Cited

U.S. PATENT DOCUMENTS

| | | | | |
|---|---|---|---|---|
| 5,572,666 | A * | 11/1996 | Whitman | 714/32 |
| 6,701,519 | B1 * | 3/2004 | Cowan | 717/130 |
| 6,978,401 | B2 * | 12/2005 | Avvari et al. | 714/38 |
| 7,137,103 | B2 * | 11/2006 | Aizenbud-Reshef et al. | 717/124 |
| 2004/0064544 | A1 | 4/2004 | Barsness et al. | |
| 2006/0107102 | A1 | 5/2006 | Nagin et al. | |

* cited by examiner

*Primary Examiner* — Michael P Nghiem
*Assistant Examiner* — Felix E Suarez

(57) ABSTRACT

A method for checking an alternative system test, the method includes: determining a relationship between (i) utilization of resources during an execution of a group of programs by a first system when operating in a non-testing mode and (ii) utilization of resources during an executive of an alternative system test by the alternative system; wherein the alternative system test comprises at least on program of the group of programs.

19 Claims, 4 Drawing Sheets

SYSTEM, METHOD AND COMPUTER PROGRAM PRODUCT FOR EVALUATING A TEST OF AN ALTERNATIVE SYSTEM

FIELD OF THE INVENTION

The present invention relates to methods, systems and computer program products for checking a test of an alternative system.

BACKGROUND OF THE INVENTION

The importance of information systems, as well as their sizes, have increased dramatically over the last decades. In order to preserve information and the ability to process it, various techniques have been developed. One of these techniques is known as failure recovery (also known as disaster recovery). A system that is capable of failure recovery includes a primary site (also referred to as production site) and a recovery site (also referred to as secondary site). Once the primary site fails the secondary site is supposed to replace it. It is noted that various systems can include multiple secondary sites and, alternatively or additionally, multiple primary sites.

A typical secondary site can store a large amount of information as well as host a large amount of application code.

To ensure that a secondary site will be able to fulfill its function if the production site fails, it is necessary to test it.

Similarly, systems are tested before deploying code upgrades in production.

In both these cases—recovery and code upgrade—and conceivably in others as well, there is a production system and an alternative system. A test is conducted to ensure that the alternative system will be able to fulfill its role when necessary.

The quality of an alternative system test depends, among others, on the extent to which application code in the alternative system was exercised, and on the extent to which information in the alternative system was accessed.

It is usually impossible to know if an alternative system test has been comprehensive enough to adequately ensure suitable operation of the alternative system in a case of failure of the production system. It is easy to run into situations where there is a mismatch between application code and data in the alternative system, but the mismatch was not detected due to an oversight during test planning.

There is a need to provide efficient methods, systems and computer program products for checking an alternative system test.

SUMMARY OF THE PRESENT INVENTION

A method for checking an alternative system test, the method includes: determining a relationship between (i) utilization of resources during an execution of a group of programs by a first system when operating in a non-testing mode and (ii) utilization of resources during an execution of an alternative system test by the alternative system; wherein the alternative system test comprises at least one program of the group of programs.

Conveniently, the resources are database tables, functions, groups of lines of code, memory volumes or a combination thereof.

Conveniently, the determining is responsive to at least one of the following or a combination thereof: operations performed on memory volumes, utilization of resources during different operational modes of the alternative system, utilization of resources during different operational modes of the first system, differences between programs included in the group of programs and programs that are executed during the alternative system test, acceptable differences between the first system and the alternative system, and values of at least one state variable during an execution of the alternative system test.

Conveniently, the determining is preceded by maintaining multiple records indicative of resources being utilized during different states of the alternative system.

Conveniently, the method includes evaluating the alternative system test in response to the relationship.

BRIEF DESCRIPTION OF THE DRAWINGS

The present invention will be understood and appreciated more fully from the following detailed description, taken in conjunction with the drawings in which.

DETAILED DESCRIPTION OF THE DRAWINGS

According to an embodiment of the invention a method for checking an alternative system test is provided. The method includes monitoring utilization of resources by a first system that operates in a non-testing mode, monitoring utilization of resources by an alternative system during an execution of an alternative system test, comparing the monitored information representative of the monitored utilization of resources; and evaluating the alternative system test in response to the received comparison.

Conveniently, the monitoring of the utilization of resources by the first system is performed on an on-going basis. Conveniently, there is no need to tailor a recovery test program that should be fully supported by both first system and alternative system. The first system can operate in a non-testing mode and is not required to enter a dedicated recovery failure plan test mode in order to produce the monitoring information. Conveniently, a first system monitor can be controlled by explicit commands such as start monitoring of the utilization of resources, stop monitoring of the utilization of resources, reset monitoring information and the like. Conveniently, the start monitoring command can include information indicating which resources to start monitoring, the stop monitoring commands can include information indicating which resources to stop monitoring, and the reset monitoring information can indicate which monitoring information to reset, but this is not necessarily so. The same can be applied, mutatis mutandis to an alternative system monitor.

Figure 1:
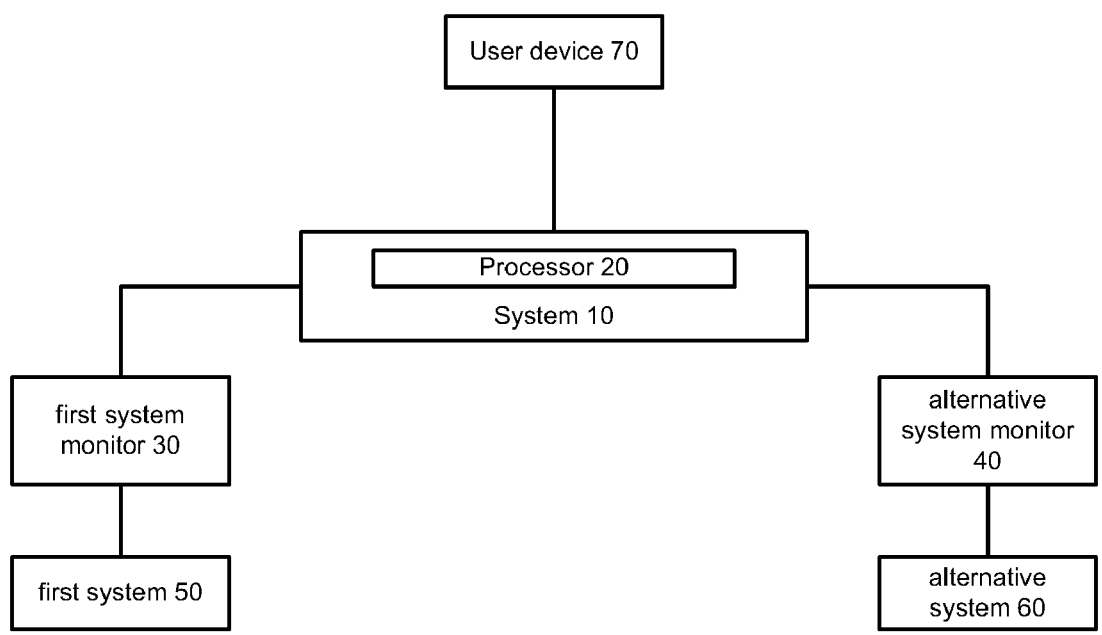
FIG. 1 illustrates a system and its environment, according to an embodiment of the invention.

FIG. 1 illustrates system 10 and its environment according to an embodiment of the invention.

System 10 includes processor 20 that is adapted to receive monitoring information from first system monitor 30 and alternative system monitor 40.

Processor 20 is adapted to compare between monitoring information gathered by first system monitor 30 and monitoring information gathered by alternative system monitor 40. It is noted that each monitor (out of monitors 30 and 40) can include multiple software or hardware components and that each monitor can be characterized by distributed or centralized architecture. It is further noted that each monitor can interface with entities included within the production (or alternative system) or accessed by the production (or alternative system). Conveniently, each monitor can include an agent enabling the monitor to send monitoring information over a network.

First system monitor 30 can be included within first system 50 or can be connected, directly or indirectly, to first system 50. For simplicity of explanation FIG. 1 illustrates first system monitor 30 as being connected to (but not included within) first system 50.

Alternative system monitor 40 can be included within alternative system 60 or can be connected, directly or indirectly, to alternative system 60. For simplicity of explanation FIG. 1 illustrates alternative system monitor 40 as being connected to (but not included within) alternative system 60.

It is noted that system 10 can include at least one of the following: first system 50, alternative system 60, first system monitor 30 and alternative system monitor 40.

System 10 can evaluate an alternative system test based on the comparison between monitoring information gathered by production and alternative system monitors 30 and 40 and/or enables a user (or other person) to perform the evaluation.

It is noted that each two or more entities out of processor 20, first system monitor 30, alternative system monitor 40, first system 50 and alternative system 60 can be connected to each other by a network or by other communication means.

System 10 is also connected to user device 70. User device 70 can enable a user to participate in various stages of method 200 mentioned below. The user, by using user device 70 and especially by using code installed on user device, may compare between monitoring information provided by first system monitor 30 and alternative system monitor 40, to evaluate an alternative system test and the like. User device 70 can be connected to system 10 but can also be connected to first system monitor 30 and/or alternative system monitor 40 while bypassing system 10. User device 70 can be a computer but this is not necessarily so.

Figure 2:
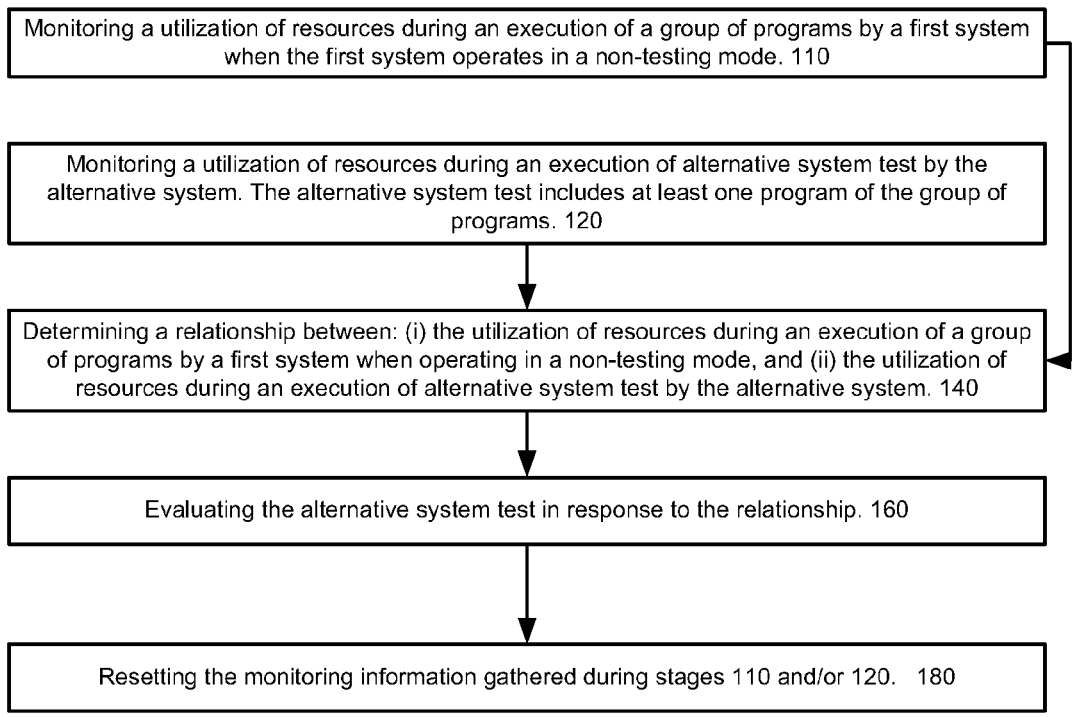
FIG. 2 is a flow chart of a method for checking an alternative system test according to an embodiment of the invention.

The functionality of the above-mentioned components is further illustrated in FIG. 2.

FIG. 2 is a flow chart of method 100 for checking an alternative system test according to an embodiment of the invention.

Method 100 starts by stages 110 and 120. Stage 110 includes monitoring utilization of resources during an execution of a group of programs by a first system when the first system operates in a non-testing mode. Thus, the first system is not required to enter a dedicated alternative system test mode.

Stage 120 includes monitoring utilization of resources during an execution of an alternative system test by the alternative system. The alternative system test includes at least one program from the group of programs.

Conveniently, the resources monitored during either one of stage 110 and 120 may include at least one of the following (or a combination thereof): database tables, virtual memory volumes, physical memory volumes, software functions, hardware functions, groups of lines of code and the like. It is noted that the resources can be physical resources, virtual resources, software resources, hardware resources or a combination thereof.

Conveniently, stage 110 and/or stage 120 of monitoring can include generating monitoring information that may include resources that were utilized, the number of times each resource was utilized, the program that is associated with the utilization of the resource, the timing of resource utilization, the type of utilization, resource utilization problems, and the like. The monitoring information can represent resource utilization statistics and/or resource utilization patterns, but this is not necessarily so.

Conveniently, the monitoring information can be arranged in one or more formats such as tables, log files and the like. The monitoring information gathered during stage 110 can be referred to as a first system coverage profile while the monitoring information gathered during stage 120 can be referred to as alternative system coverage profile.

According to another embodiment of the invention the monitoring information can be compressed or selectively generated. For example, the monitoring information can be updated every few utilizations of a resource and not be updated in response to each single utilization of each resource. The compression or selective generation of monitoring information can assist in preventing the size of the monitoring information from exceeding various size thresholds, in assisting in managing the monitoring information and the like.

According to yet another embodiment of the invention the monitoring of stage 120 can include maintaining multiple records indicative of resources being utilized during different states of the alternative system. Additionally or alternatively, the monitoring of stage 110 can include maintaining multiple records indicative of resources being utilized during different states of the first system.

According to yet a further embodiment of the invention, the monitoring of stage 110 can be responsive to values of at least one state variable (representative of a state of at least a portion of the first system) during an execution of the group of programs.

According to yet a further embodiment of the invention, the monitoring of stage 120 can be responsive to values of at least one state variable (representative of a state of at least a portion of the alternative system) during an execution of the alternative system test.

Conveniently, method 100 can enable a user to access at least some of the monitoring information gathered during stage 110 and/or during stage 120. This access can be performed by executing a monitoring information retrieval program, function or command.

Conveniently, either one of stages 110 and 120 of monitoring (or a combination of both) includes monitoring via database management software, which operations were performed on each table during a specified time span.

Conveniently, either one of stages 110 and 120 of monitoring (or a combination of both) includes monitoring, by a storage sub-system software, which operations were performed on every logical and/or physical volume during a specified time span.

Stages 110 and 120 are followed by stage 140 of determining a relationship between: (i) the utilization of resources during an execution of a group of programs by a first system when operating in a non-testing mode, and (ii) the utilization of resources during an execution of an alternative system test by the alternative system.

Conveniently, the determining of stage 140 is responsive to operations performed on physical and/or logical memory volumes.

According to an embodiment of the invention the determining of stage 140 is responsive to utilization of resources during different operational modes of the alternative system and/or during different operational modes of the first system.

These operational modes can include, for example, wake-up mode, startup phase, normal operation, database recovery mode, and the like.

Conveniently, the comparison of stage 140 can ignore irrelevant monitoring information. Irrelevant monitoring information can result from differences between the group of programs and the alternative system test. For example, if a certain program is included in the group of programs but is excluded by design during the alternative system test, then the resources utilized by this program are masked or otherwise not taken into account when the relationship is determined.

Irrelevant monitoring information can result from acceptable differences between the first system and the alternative system. These acceptable differences can result from differences in the hardware of the first system and the alternative system, differences in the configurations of the first system and the alternative system, differences in the expected functionalities of the first system and the alternative system, and the like. For example, while the first system is expected to mirror one or more data items to the alternative system, the alternative system is not expected to perform such mirroring, especially after the first system is simulated to have failed.

Irrelevant monitoring information can result from differences attributed to irrelevant applications or uninteresting failure recovery phases.

It is noted that stage 140 can include masking irrelevant monitoring information. This masking can be done automatically, manually (for example as part of a service), partially manually, partially automatically, and the like.

Stage 140 is followed by stage 160 of evaluating the alternative system test in response to the relationship.

Stage 160 of evaluating can include finding gaps between resources utilized during stages 110 and 120, finding gaps between the utilization of resources during stages 110 and 120, estimating the importance of at least one gap, providing an indication about at least one gap, estimating amendments in the recovery failure test that can bridge at least one gap, storing information representative of at least one gap, displaying information representative of at least one gap, and the like.

Stage 160 can include calculating a similarity between monitoring information gathered during stage 110 and monitoring information gathered during stage 120. A similarity can indicate that the alternative system test covers the failure recovery plan satisfactorily. It is noted that the similarity can involve assigning weights to important resources or to important the utilization of resources.

A sample similarity function can have the following format: (number of function points that were utilized by both first system and alternative system)/(number of function points utilized by a single site out of the first system and the alternative system).

According to an embodiment of the invention, stage 160 is followed by stage 180 of resetting the monitoring information gathered during stages 110 and/or 120. The resetting can be followed by repeating stages 110-160 such as to refresh the evaluation of the alternative system test. The resetting can be replaced by compressing or selectively erasing monitoring information. It is noted that the resetting can be performed independently from the monitoring.

It is noted that one or more stages of method 100 can be executed by a user. This execution may require at least one of the following: (i) providing user access to monitoring information, (ii) providing a user with a means for determining the relationship between monitoring information gained during stage 110 and during stage 120, (iii) providing a user with a means for evaluating the recovery failure test, (iv) providing the user with the means to reset monitoring information, (v) providing the user with the means to alter or replace an alternative system test, and the like. The means stated above can include one or more commands, one or more programs, and the like.

Figure 3:
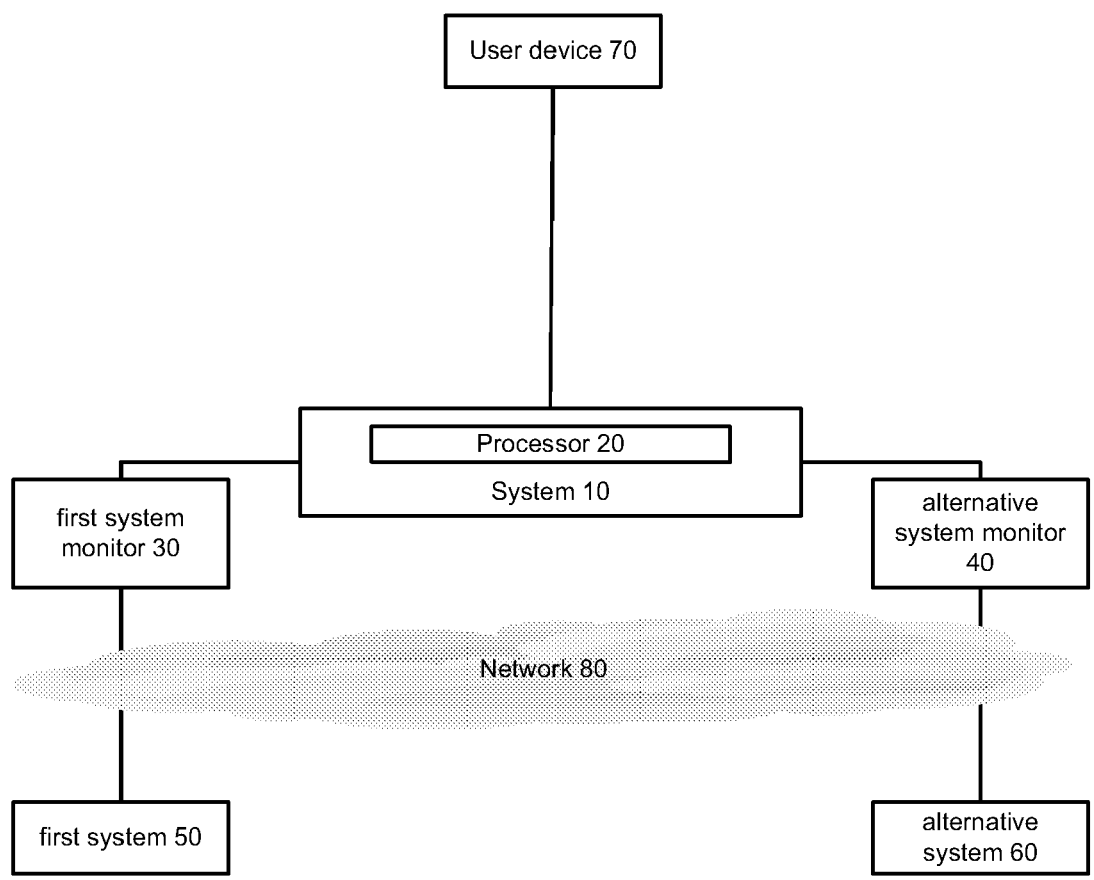
FIG. 3 illustrates a system and its environment according to an embodiment of the invention.

FIG. 3 illustrates system 10 and its environment according to another embodiment of the invention.

FIG. 3 differs from FIG. 1 by including network 80 located between system 10, first system 50 and alternative system 60. System 10 can receive monitoring information over network 80. User device 70 can be connected to system 10 over another network (not shown).

Figure 4:
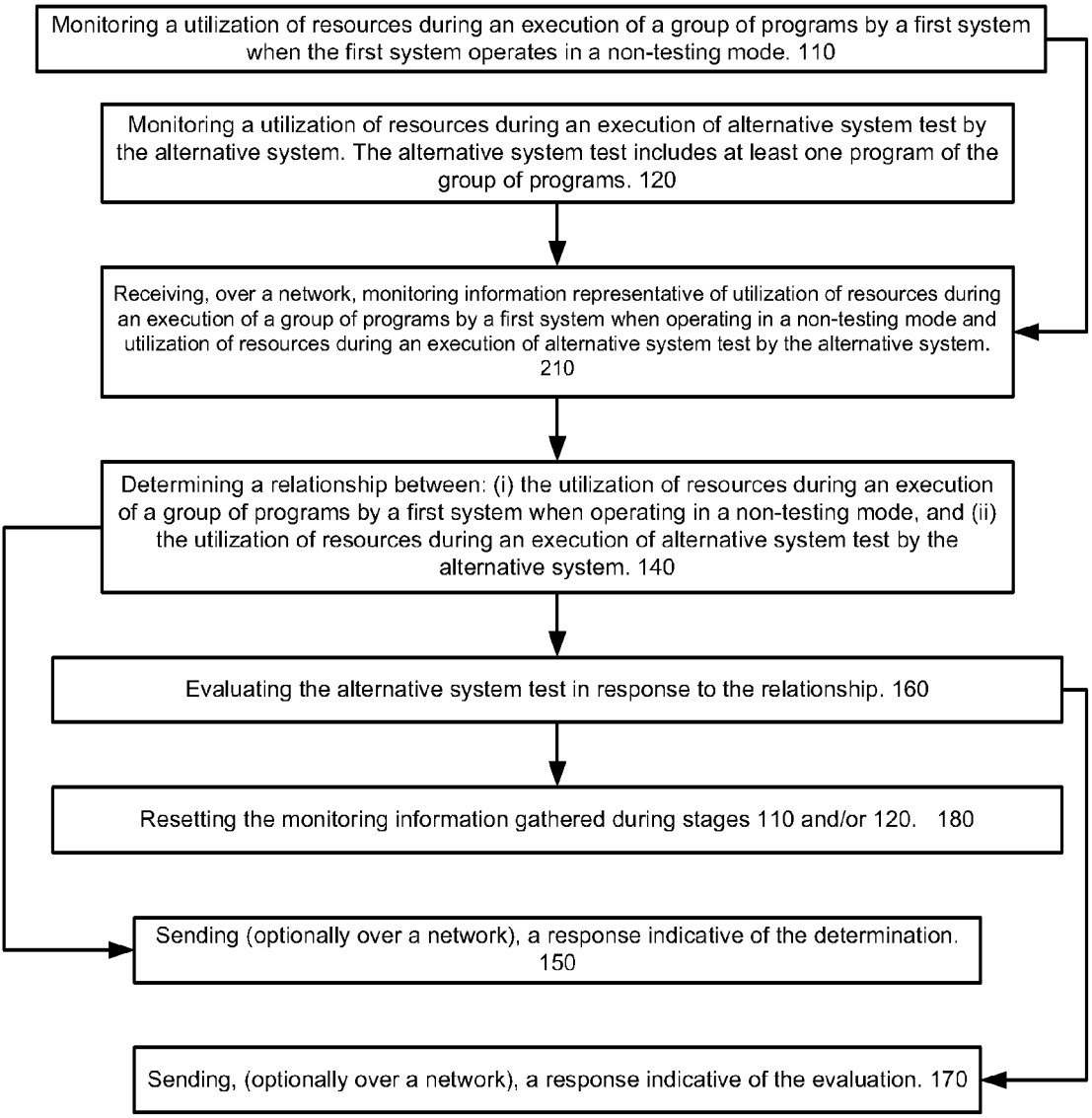
FIG. 4 is a flow chart of a method for providing a service to a customer over a network according to an embodiment of the invention

FIG. 4 is a flow chart of method 200 for providing a service to a customer over a network, according to an embodiment of the invention.

Method 200 starts by stages 110 and 120. Stage 110 includes monitoring utilization of resources during an execution of a group of programs by a first system when the first system operates in a non-testing mode. Stage 120 includes monitoring utilization of resources during an execution of alternative system test by the alternative system. The alternative system test includes at least one program of the group of programs.

Stages 110 and 120 are followed by stage 210 of receiving, over a network, monitoring information representative of utilization of resources during an execution of a group of programs by a first system when operating in a non-testing mode and utilization of resources during an execution of alternative system test by the alternative system.

Stage 210 is followed by stage 140 of determining a relationship between (i) utilization of resources during an execution of a group of programs by a first system when operating in a non-testing mode and (ii) utilization of resources during an execution of alternative system test by the alternative system; wherein the alternative system test comprises at least one program of the group of programs.

Stage 140 is followed by stage 150 of sending a response (optionally over a network connected between a user device and a system that determined the relationship), indicative of the determined relationship.

According to an embodiment of the invention stage 150 is followed by stage 160 of evaluating the alternative system test in response to the relationship.

Conveniently, stage 160 is followed by stage 180 of resetting the monitoring information gathered during stages 110 and/or 120. It is noted that the resetting can be performed independently from the monitoring.

It is noted that according to various embodiments of the invention, stage 140 can be followed by stage 160 and that stage 160 can be followed by stage 170 of sending a response (optionally over a network connected between a user device and a system that determined the relationship) indicative of the evaluation.

For simplicity of explanation FIG. 4 illustrates stages 140, 150, 160 and 170. Those of skill in the art will appreciate that method 200 can include only one out of stages 150 and 170.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Conveniently, a computer program product that includes a computer usable medium is provided. The computer program product includes a computer readable program which, when executed on a computer, causes the computer to receive, over a network, a request to check an alternative system test; determine a relationship between (i) utilization of resources during an execution of a group of programs by a first system when operating in a non-testing mode and (ii) utilization of resources during an execution of an alternative system test by the alternative system; wherein the alternative system test includes at least one program of the group of programs; and send, over the network, a response indicative of the determined relationship.

Conveniently, a computer program product that includes a computer usable medium is provided. The computer program product includes a computer readable program which, when executed on a computer, causes the computer to determine a relationship between (i) utilization of resources during an execution of a group of programs by a first system when operating in a non-testing mode and (ii) utilization of resources during an execution of an alternative system test by the alternative system; wherein the alternative system test includes at least one program of the group of programs.

Conveniently, a computer program product that includes a computer usable medium is provided. The computer program product includes a computer readable program which, when executed on a computer, causes the computer to (i) retrieve monitoring information representative of a utilization of resources during an execution of a group of programs by a first system when operating in a non-testing mode, (ii) retrieve monitoring information utilization of resources during an execution of an alternative system test by the alternative system wherein the alternative system test includes at least one program of the group of programs; and (iii) determine a relationship between the utilization of resources during an execution of the group of programs by the first system when operating in the non-testing mode and the utilization of resources during the execution of the alternative system test by the alternative system; wherein the alternative system test includes at least one program of the group of programs.

Conveniently, the resources include database tables.
Conveniently, the resources include memory volumes.
Conveniently, the resources include groups of code lines.
Conveniently, the computer readable program, when executed on a computer, causes the computer to determine the relationship in response to operations performed on the memory volumes.
Conveniently, the computer readable program when executed on a computer causes the computer to determine the relationship in response to utilization of resources during different operational modes of the alternative system.
Conveniently, the computer readable program when executed on a computer causes the computer to determine the relationship in response to utilization of resources during different operational modes of the first system.
Conveniently, the computer readable program when executed on a computer causes the computer to maintain multiple records indicative of resources being utilized during different states of the alternative system.
Conveniently, the resources include functions.
Conveniently, the computer readable program when executed on a computer causes the computer to evaluate the alternative system test in response to the relationship.
Conveniently, the computer readable program when executed on a computer causes the computer to evaluate the alternative system test in response to differences between the group of programs and the alternative system test.
Conveniently, the computer readable program when executed on a computer causes the computer to evaluate the alternative system test in response to acceptable differences between the first system and the alternative system.
Conveniently, the computer readable program when executed on a computer causes the computer to determine the relationship in response to values of at least one state variable during an execution of the second group of programs.

Variations, modifications, and other implementations of what is described herein will occur to those of ordinary skill in the art, without deviating from the spirit and the scope of the invention as claimed.

Accordingly, the invention is to be defined not by the preceding illustrative description but instead by the spirit and scope of the following claims.

We claim:
1. A method comprising:
providing a first system operating in a non-testing mode, the first system including resources that include at least a group of programs;
providing an alternative system, the alternative system including an alternative system test that comprises at least one program of the group of programs;
monitoring the utilization of resources of the first system and the utilization of resources of the alternative system during the alternative system test; and
comparing information gathered from monitoring the first system with information gathered from monitoring the alternative system during the alternative system test for determining a relationship between the utilization of resources of the first system and the utilization of resources the alternative system during the alternative system test.
2. The method of claim 1 wherein the resources comprise at least one of physical resources, virtual resources, software resources, and hardware resources.

3. The method of claim 2 further comprising:
wherein the resources comprise at least one of database tables, virtual memory volumes, physical memory volumes, software functions, hardware functions, and groups of lines of code.

4. The method of claim 1 further comprising:
wherein the information gathered from monitoring the first system and from monitoring the alternative system during the alternative system test can be at least one of compressed and selectively generated.

5. The method of claim 3 further comprising:
wherein utilizing the resources during different operational modes of the first system invokes determining the relationship between the utilization of resources of the first system and the utilization of resources of the alternative system; and
wherein utilizing the resources during different operational modes of the alternative system invokes determining the relationship between the utilization of resources of the first system and the utilization of resources of the alternative system during the alternative system test.

6. The method of claim 1 further comprising:
monitoring the utilization of resources of the first system on an ongoing basis.

7. The method of claim 4 wherein information gathered from monitoring the first system and from monitoring the alternative system during the alternative system test can include at least one of the resources that are utilized, a number of instances each resource is utilized, and a program that is associated with the utilization of the resource.

8. The method of claim 1 further comprising:
evaluating the alternative system test in response to the determined relationship between the utilization of resources of the first system and the utilization of resources of the alternative system during the alternative system test.

9. The method of claim 1 further comprising:
detecting at least one difference between at least one program of the group of programs and the at least one program of the group of programs comprising the alternative system test; and
determining the relationship between the utilization of resources of the first system and the utilization of resources of the alternative system during the alternative system test.

10. The method of claim 1 further comprising:
detecting at least one acceptable difference between the first system and the alternative system; and
determining the relationship between the utilization of resources of the first system and the utilization of resources of the alternative system during the alternative system test.

11. The method of claim 1 further comprising:
detecting at least one value of at least one state variable during an execution of the alternative system test; and
determining the relationship between the utilization of resources of the first system and the utilization of resources of the alternative system during the alternative system test.

12. A system comprising:
a first system operating in a non-testing mode, the first system including resources that comprise at least a group of programs;
an alternative system, the alternative system comprising resources that include an alternative system test, the alternative system test comprising at least one program of the group of programs;
a monitor for monitoring the utilization of resources of the first system on an ongoing basis and for monitoring the utilization of resources of the alternative system during the alternative system test; and
a processor for comparing information gathered by the monitor and determining a relationship between the utilization of resources of the first system and the utilization of resources of the alternative system during the alternative system test.

13. The system of claim 12, wherein the resources comprise at least one of physical resources, virtual resources, software resources, and hardware resources.

14. The system of claim 13 further comprising:
wherein the resources comprise at least one of database tables, virtual memory volumes, physical memory volumes, software functions, hardware functions, and groups of lines of code.

15. The system of claim 12 further comprising:
a first system monitor for monitoring the utilization of resources of the first system on an ongoing basis; and
an alternative system monitor for monitoring the utilization of resources of the alternative system during the alternative system test.

16. The system of claim 15 further comprising:
wherein the information gathered from monitoring the first system and from monitoring the alternative system during the alternative system test can be at least one of compressed and selectively generated.

17. The system of claim 12 further comprising:
the processor evaluating the alternative system test in response to determining the relationship between the utilization of resources of the first system and utilization of resources of the alternative system during the alternative system test.

18. The system of claim 12 further comprising:
the processor detecting at least one acceptable difference between the first system and the alternative system for determining the relationship between the utilization of resources of the first system and the utilization of resources of the alternative system during the alternative system test.

19. The system of claim 12 further comprising:
the processor detecting at least one value of at least one state variable during an execution of the alternative system test; and
the processor determining the relationship between the utilization of resources of the first system and the utilization of resources of the alternative system during the alternative system test.

* * * * *